April 25, 1939.  F. NALLINGER  2,155,950
CONTROLLING APPARATUS FOR AN INTERNAL COMBUSTION ENGINE
Filed May 13, 1937

Inventor

Patented Apr. 25, 1939

2,155,950

UNITED STATES PATENT OFFICE

2,155,950

CONTROLLING APPARATUS FOR AN INTERNAL COMBUSTION ENGINE

Fritz Nallinger, Stuttgart, Germany, assignor to Daimler-Benz Aktiengesellschaft, Stuttgart-Unterturkheim, Germany Application May 13, 1937, Serial No. 142,438
In Germany May 4, 1936

14 Claims. (Cl. 137—139)

My invention relates to a controlling apparatus for an internal combustion engine, more particularly for an aircraft engine.

Engines operating under variable atmospheric pressure, such as aircraft engines, are usually equipped with a pressure-responsive altimeter including a capsular element which governs the operation of the engine by control of a suitable device thereof, such as a fuel valve, a valve controlling air supplied to a carburettor, a fuel injector, the conduit of the controlling liquid for a clutch, or a gear driving a compressor or the like.

These capsular elements are made of a resilient sheet metal, for instance in form of a bellows. When the aircraft reaches higher altitudes, the atmospheric pressure surrounding the capsular element decreases relative to the pressure prevailing within the element, and, therefore, the element expands. This expansion operates a linkage connected to the capsular element, whereby the adjustment of the device to be controlled is changed. This change may be such as to adjust the device to a fuel-saving position.

It may happen that a leakage occurs in the walls of the capsular element permitting an equalization of pressure to take place between the interior of the element and the surrounding atmosphere. In the apparatus of the character described which were known prior to my invention, the capsular element is evacuated to a substantial degree and, therefore, such equalization of pressure entails an expansion of the element to an undesirable extent, whereby the device to be controlled is adjusted to its most economical fuel saving position.

When the device to be controlled is the carburettor of the engine, such adjustment to the most economical fuel saving condition will be injurious to the engine and may cause serious damage, if the equalization of pressure occurs while the aircraft is flying at a low altitude, as in this event the mixture supplied by the carburettor to the engine will become too lean on account of the adjustment to the most economical fuel saving position.

The primary object of my invention is to provide an apparatus of the character described in which this disadvantage is avoided and in which the controlling device of the engine is adjusted to its normal position when a leakage occurs. More particularly, an object of my invention is the provision of a controlling apparatus including an altimeter element governing the carburettor in which a leakage of the capsular element will render the fuel mixture richer.

Further objects of my invention will appear from the description thereof following hereinafter. I attain these objects by such an arrangement and organization of the pressure-responsive capsular element and the device to be controlled thereby that the element returns to the normal controlling position when an equalization of the pressures prevailing within and outside of the element occurs. Preferably, the coordination of the capsular element to the device to be controlled is such that the adjustment resulting from a leakage has little or no tendency towards the fuel-saving condition but only towards the position for a rich mixture. For this purpose, the pressure prevailing within the capsular element during the flight must be higher than the atmospheric pressure. In this event, an equalization of the pressures will result in a contraction of the element when occurring during the flight.

Three embodiments of my invention are illustrated in the accompanying drawing in which.

Figure 1:
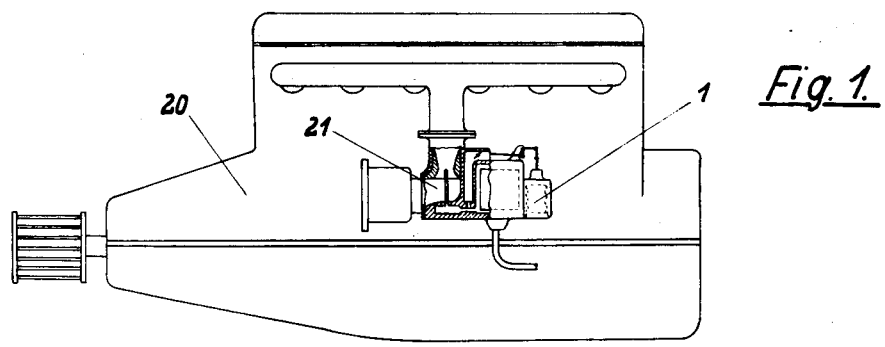
Fig. 1 is an elevation of an aircraft engine and of my improved controlling apparatus.
Figures 2, 3:
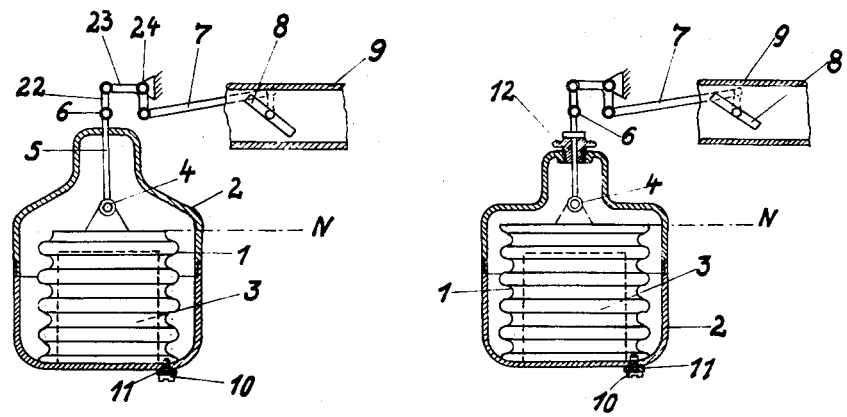
Fig. 2 is a view of the controlling apparatus of Fig. 1 on an enlarged scale, partly in section, in normal condition.
Fig. 3 is a view similar to that of Fig. 2 of a slightly modified embodiment.

With reference to Fig. 1, the aircraft engine 20 adapted to drive the propeller is equipped with a carburettor 21. The ratio of the fuel and the air in the mixture supplied by the carburettor 21 to the engine is controlled by the so-called diluting air valve 8 of the carburettor included in an air conduit 9 (Fig. 2). As the carburettor is known per se, it need not be described in detail. The pressure-responsive capsular altimeter element 1 in form of a bellows is included in a casing 2 and is rigidly attached to the bottom thereof. Within the bellows there is included a rigid body 3 also attached to the bottom of the casing serving the purpose of decreasing the volume of the bellows and of thus reducing the influence of the temperature to a minimum. The top plate of the bellows is provided with a bracket or similar device to which a rod 5 is pivoted by a hinge 4. The rod extends through an opening in the top of the casing 2 and is pivotally connected at 6 to a link 22, the other end of which is pivoted to the horizontal arm 23 of a bell-crank. This bell-crank is pivoted to suitable means such as a bracket 24. Its lower arm is connected with the supporting shaft of the butterfly valve 8 by means such as a link 7. It will appear from this description that an expansion of the bellows 1 will produce a pivotal movement of the bell-crank in clockwise direction, whereby the valve 8 is moved towards its open position.

The bottom of the casing 2 which forms at the same time the bottom of the bellows is preferably provided with a threaded opening in which a plug bolt 10 provided with a washer 11 is inserted. This plug constitutes a valve controlling the communication of the bellows with the atmosphere. It is to be understood that the casing 2, the bracket 24 and the conduit 9 are mounted in rigid relationship to each other on the engine or other relatively stationary member.

The operation of the apparatus is as follows: When the aircraft equipped with the apparatus reaches higher altitudes, the atmospheric pressure entering the casing 2 through the opening in the top thereof and surrounding the bellows decreases, thus causing the bellows to expand longitudinally. When the aircraft descends, the atmospheric pressure increases and the bellows contracts. The capsular element 1 is so dimensioned that its top assumes the position indicated at N in Fig. 2 when the element is free from any stress. This position, which will be termed the normal position hereinafter, corresponds to an adjustment of the valve 8 resulting in a comparatively rich mixture as required for normal atmospheric pressure prevailing at the ground level. To eliminate any stress in the walls of the bellows 1, when the aircraft is on the ground, the screw plug 10 is removed or loosened so that the bellows may freely communicate with the atmosphere. Then, the screw plug 10 is tightened again. When the aircraft rises and reaches higher altitudes, the capsular element 1 expands and gradually changes the adjustment of the carburettor towards the fuel saving condition thereof. This is done in the embodiment shown by gradually opening the valve 8 thus more freely admitting the diluting air to the carburettor. If the capsular element should spring a leakage in higher altitudes for some reason or another, the pressure prevailing in the interior thereof and the surrounding atmospheric pressure will equalize and this will cause the element to return to the normal position N thus restoring the adjustment of the valve 8 to normal. While this may have the effect of setting the carburettor for too rich a mixture considering the altitude of operation, the supply of too rich a mixture to the engine is not injurious and does no harm to the engine. In this way, the risk of supplying too lean a mixture to the engine is avoided.

The embodiment of Fig. 3 is similar to that of Fig. 2 and differs therefrom by the provision only of means preventing contraction of the capsular element beyond a predetermined limit. For this purpose, a collar is attached to the rod 5 which may abut against an adjustable stop 12. The stop 12 is in form of a bushing which surrounds the rod 5 and is screwed into a threaded bore provided in the top of the casing 2. The casing is provided with a suitable opening (not shown) establishing communication of its interior with the atmosphere. The stop 12 is so adjusted that the bellows tends to contract by its resiliency. Moreover, the bellows is slightly evacuated, for instance to a pressure of from 400 to 700 millimeters mercury column reduced to zero centigrade temperature (from 7.7 to 13.5 pounds per square ft.). An atmospheric pressure of 400 millimeters corresponds to an altitude of about 17,000 ft. Therefore, the bellows will not expand and will not change the adjustment of the device 8 unless the altitude of operation exceeds 17,000 ft. If it should happen at a higher altitude of, say, 23,000 ft. that the bellows 1 leaks, it will contract owing to its resiliency to the position N in which the collar on rod 5 abuts against the stop 12. Thus, the apparatus will be re-set to normal and the leakage has the effect of relatively increasing the fuel supply rather than decreasing it.

It may be mentioned that in this case the controlling apparatus would adjust the engine to too lean a mixture below the flying altitude of 17,000 ft., if the normal condition N results in a fuel mixture proper for this altitude. Therefore, I prefer, as a compromise, an adjustment of the carburettor supplying a comparatively rich mixture when the apparatus assumes the normal position shown in Fig. 3. By adjusting the stop 12, the apparatus may be set in accordance with any desired normal altitude.

When applied to engines provided with compressors and pressure carburettors, the capsular element is preferably set to the same altitude to which the compressor is set, as with this arrangement the fuel-saving device need not be operated until this altitude is reached.

Figure 4:
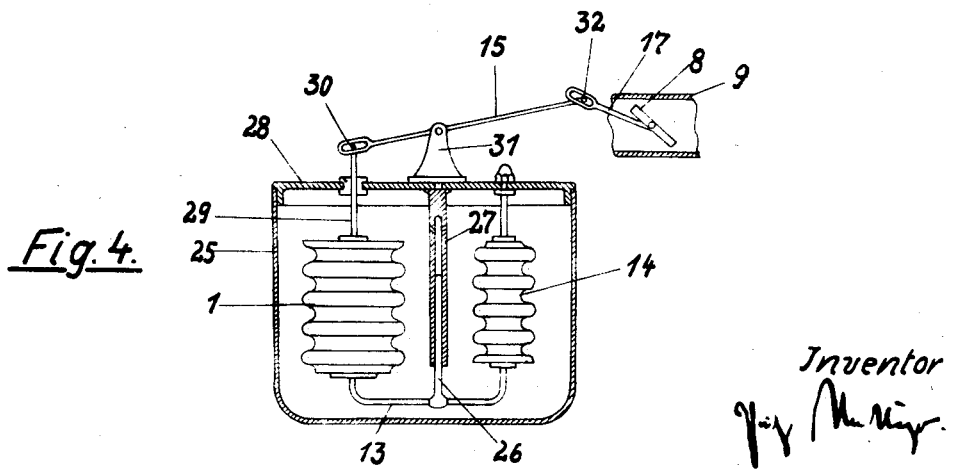
Fig. 4 illustrates a third embodiment including a thermostatic element, the casing being shown in section.

In Fig. 4 a modified embodiment is shown in which a thermostatic element is provided to eliminate the influence of changes of the temperature. In this embodiment, the bellows 1 is not rigidly attached to the bottom of the casing 25, but is mounted on a movable member 13 which may be in form of a suitably guided bar. In the embodiment shown, a rod 26 is attached to the bar 13 and is slidably guided within a tubular member 27 rigidly attached to the cover 28 of the casing 25. The other end of the bar 13 is attached to the bottom end of a thermostatic element 5, the upper end of which is attached to the cover 28. It will be noted that the two bellows 1 and 14 are included in the same casing communicating with the atmosphere through a suitable port (not shown), and that the thermostatic element determines the position of the altimeter element 1 relative to its support 25. The upper end of the bellows 1 is rigidly connected to a rod 29 which extends through and is guided in the cover 28. A horizontal pin 30 attached to the upper end of rod 29 engages a slot in one arm of a lever 15 which is pivoted to a suitable bracket 31 preferably mounted on the cover 28. The other arm of the lever 15 has a horizontal pin 32 engaging a slot in an arm 17 attached to the shaft of the valve 8 provided in the conduit 9, as above described.

It will be noted that an expansion of the bellows 1 will open the throttle 8 thus relatively reducing the fuel supply to the engine. Any suspension of the bellows 1, however, which is caused by an increase of temperature is compensated for by a downward displacement of the supporting bar 13 carried by the thermostat 14. The thermostat 14 may be subjected to the temperature of the outside air or to any other desired temperature, for instance, to that prevailing in the neighbourhood of the engine.

The rod 29 may be provided with a collar cooperating with a stop, such as stop 12 shown in Fig. 3, to prevent the bellows 1 from contracting beyond a certain limit. This will have the effect described above with reference to Fig. 3.

From the above description, the construction and operation of my improved apparatus should be clear to those skilled in the art. However, the possibility of numerous modifications thereof is obvious. Thus, the means cooperatively connecting the capsular altimeter element with the controlling device governing the operation of the engine may be modified considerably with regard to the direction of motion of its elements and with regard to its ratio of transmission depending on the requirements of the particular device. Also, the structure and shape of the pressure- and temperature-responsive elements and their connection may be modified. Obviously, means for manual adjustment may be added for the purpose of increasing or replacing the automatic controlling effect. Therefore, it is clear that the invention is not limited to the exact details of construction shown but includes such variations and modifications as come within the scope of the appended claims.

What I claim is:

1. Fuel supply controlling apparatus adapted to operate under variable atmospheric pressure comprising, in combination, a hollow expansible pressure-responsive altimeter element, a controlling member adapted to govern the fuel supply and movable from a normal position to an abnormal position, and means connecting said element with said member, the internal pressure of said element being so chosen as to cause the same in event of leakage to move said controlling member to its normal position.

2. Fuel supply controlling apparatus comprising, in combination, a hollow expansible pressure-responsive element, the internal pressure of which exceeds the atmospheric pressure above a predetermined altitude, a controlling member governing the fuel supply, and means connecting said capsular element with said controlling member and operative to cause said controlling member to reduce the fuel supply in response to an expansion of said element and to increase said fuel supply in response to a contraction of said element, whereby a leakage of said element occurring above said altitude will have the effect of relatively increasing the fuel supply.

3. Fuel supply controlling apparatus comprising, in combination, a hollow expansible pressure-responsive element, the internal pressure of which exceeds the atmospheric pressure above a predetermined altitude, a controlling member governing the supply of diluting air to the fuel supply, and means connecting said capsular element with said controlling member and operative to cause said controlling member to increase the air supply in response to an expansion of said element and to reduce said air supply in response to a contraction of said element, whereby a leakage of said element occurring above said altitude will cause the supply of a richer fuel mixture.

4. Fuel supply controlling apparatus comprising, in combination, a hollow expansible pressure-responsive element, the internal pressure above which exceeds the atmospheric pressure above a predetermined altitude, an opening adapted to connect the interior of said element with the atmosphere, removable means for closing the said opening, a controlling member governing the fuel supply, and means connecting said capsular element with said controlling member and operative to cause said controlling member to reduce the fuel supply in response to an expansion of said element and to increase said fuel supply in response to a contraction of said element, whereby a leakage of said element occurring above said altitude will have the effect of relatively increasing the fuel supply.

5. Fuel supply controlling apparatus comprising, in combination, a hollow expansible pressure-responsive element, the internal pressure of which exceeds the atmospheric pressure above a predetermined altitude, a threaded plug normally closing an opening of said element, a controlling member governing the fuel supply, and means connecting said element with said controlling member and operative to cause said controlling member to reduce the fuel supply in response to an expansion of said element and to increase said fuel supply in response to a contraction of said element, whereby a leakage of said element occurring above said altitude will have the effect of relatively increasing the fuel supply.

6. Fuel supply controlling apparatus comprising, in combination, a hollow expansible pressure-responsive element, the internal pressure of which amounts to from 400 to 700 millimeters mercury column (reduced to zero centigrade temperature), a controlling member governing the fuel supply, and means connecting said element with said controlling member and operative to cause said controlling member to reduce the fuel supply in response to an expansion of said element and to increase said fuel supply in response to a contraction of said element, whereby a leakage of said element when occurring above the altitude corresponding to said pressure will have the effect of relatively increasing the fuel supply.

7. Fuel supply controlling apparatus comprising, in combination, a hollow expansible pressure-responsive element, means cooperating therewith to prevent contraction thereof beyond a predetermined limit, the internal pressure prevailing in said element exceeding the atmospheric pressure above a predetermined altitude, a controlling member governing the fuel supply, and means connecting said element with said controlling member and operative to cause said controlling member to reduce the fuel supply in response to an expansion of said element and to increase said fuel supply in response to a contraction of said element, whereby a leakage of said element occurring above said altitude will have the effect of relatively increasing the fuel supply.

8. Fuel supply controlling apparatus comprising, in combination, a support, a hollow expansible pressure-responsive element, a thermostatic element connected to said support and to said element to determine the position thereof relative to the support in dependence of the temperature, a controlling member adapted for governing the fuel supply, and means connecting said element with said controlling member and operative to cause said controlling member to reduce the fuel supply in response to an expansion of said element and to increase said fuel supply in response to a contraction of said element, whereby a leakage of said element occurring above said altitude will have the effect of relatively increasing the fuel supply irrespective of the temperature prevailing at said altitude.

9. The combination according to claim 1 in which said altimeter element is adapted to expand when the surrounding pressure decreases and to collapse when the surrounding pressure increases, in combination with means for preventing said element from collapsing beyond the normal position of said controlling member.

10. Fuel supply controlling apparatus adapted to operate at various altitudes, comprising, in combination, a hollow expansible pressure responsive element, a controlling member for varying the amount of delivered fuel, and means connecting the pressure responsive element with the said controlling element in such a manner that expansion of the pressure responsive element effects a relative reduction of the amount of delivered fuel, the pressure within the pressure responsive element being so chosen that it lies between the normal air pressure at the earth's surface and the pressure at the highest operating altitude of the fuel supply controlling apparatus, so that upon the occurrence of leakage of said element at said highest operating altitude, the element will contract and the controlling member will be adjusted to relatively increase the amount of delivered fuel.

11. Fuel supply controlling apparatus adapted to operate at various altitudes, comprising, in combination, a hollow expansible pressure responsive element, a controlling member for varying the amount of delivered fuel, means connecting the pressure responsive element with said controlling element in such a manner that expansion of the pressure responsive element effects a relative reduction of the amount of delivered fuel, a temperature responsive element, and means for connecting the temperature responsive element with the control element in such a manner that expansion of the temperature responsive element as a result of increase in temperature will effect a relative increase of the fuel supply.

12. Control apparatus according to claim 11 in which the temperature responsive element is so dimensioned that the adjustment of the control apparatus which is effected through expansion of the pressure responsive element as a result of temperature increase is substantially neutralized through reverse adjustment resulting from the expansion of the temperature responsive element, 13. Control apparatus according to claim 11 in which the pressure responsive element is adjustably mounted at that end which is opposite to the end to which the control member is attached, and the temperature responsive member is so connected with said adjustably mounted end that upon the occurrence of temperature increase this end is moved outwardly and away from the other end connected to the control member.

14. Control apparatus according to claim 11, in which the pressure within the pressure responsive element is so chosen that it lies intermediate the pressure at the earth's surface and the pressure at the greatest operating altitude, so that upon leakage of the pressure responsive element at the highest altitude the element will contract and the control apparatus will be adjusted for increasing the amount of delivered fuel.

FRITZ NALLINGER.